(12) United States Patent
Liu et al.

(10) Patent No.: US 12,018,196 B2
(45) Date of Patent: Jun. 25, 2024

(54) FLUORESCENT NANODIAMOND AND METHOD FOR PRODUCING SAME

(71) Applicant: DAICEL CORPORATION, Osaka (JP)

(72) Inventors: Ming Liu, Tokyo (JP); Masahiro Nishikawa, Tokyo (JP); Yoshihiro Inamoto, Tokyo (JP); Maki Kishimoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 273 days.

(21) Appl. No.: 17/220,844

(22) Filed: Apr. 1, 2021

(65) Prior Publication Data

US 2021/0371740 A1 Dec. 2, 2021

(30) Foreign Application Priority Data

Feb. 28, 2020 (JP) ................ 2020-033032

(51) Int. Cl.
C09K 11/65 (2006.01)
C01B 32/26 (2017.01)
C01B 32/28 (2017.01)

(52) U.S. Cl.
CPC .............. C09K 11/65 (2013.01); C01B 32/26 (2017.08); C01B 32/28 (2017.08);
(Continued)

(58) Field of Classification Search
CPC ......... C09K 11/65; C01B 32/26; C01B 32/28; C01P 2002/72; C01P 2004/64; C01P 2006/60
See application file for complete search history.

(56) References Cited

U.S. PATENT DOCUMENTS 10,287,495 B1 * 5/2019 Shenderova ........... A61K 47/02
10,364,389 B1 * 7/2019 Shenderova ......... C09K 11/025
(Continued)

FOREIGN PATENT DOCUMENTS

JP 2005-289677 A 10/2005
JP 2010-526746 A1 8/2010
(Continued)

OTHER PUBLICATIONS

International Search Report in International Application No. PCT/JP2021/014154, dated Jun. 15, 2021.

*Primary Examiner* — Melissa S Swain
*Assistant Examiner* — Catriona M Corallo
(74) *Attorney, Agent, or Firm* — Knobbe Martens Olson & Bear LLP

(57) ABSTRACT

A method of producing a fluorescent nanodiamond exhibiting a zero phonon line (ZPL) for $NV^0$ and/or $NV^-$ on its fluorescence emission wavelength spectrum. The method includes a detonation step of exploding at least one type of explosive in an airtight container to obtain a nanodiamond raw material, a first annealing step of annealing, at a temperature from 1000° C. to 1600° C., the nanodiamond raw material or a nanodiamond which is obtained by removing sp2 carbon through strong acid treatment, ozone treatment, or gas-phase oxidation of the nanodiamond raw material, a vacancy forming step of creating vacancies on the nanodiamond by irradiating the nanodiamond with an ion beam or an electron beam after the first annealing step, and a second annealing step of annealing, at a temperature from 600° C. to 900° C., the nanodiamond containing vacancies to form Nitrogen-Vacancy (NV) centers.

10 Claims, 2 Drawing Sheets

(52) U.S. Cl.
CPC ...... *C01P 2002/72* (2013.01); *C01P 2004/64* (2013.01); *C01P 2006/60* (2013.01)

(56) References Cited

U.S. PATENT DOCUMENTS

| | | |
|---|---|---|
| 2010/0135890 A1 | 6/2010 | Boudou et al. |
| 2010/0181534 A1 | 7/2010 | Shenderova et al. |
| 2015/0276754 A1 | 10/2015 | Shirakawa et al. |

FOREIGN PATENT DOCUMENTS

| | | |
|---|---|---|
| JP | 2016-060681 A | 4/2016 |
| WO | WO 2014/058012 A1 | 4/2014 |
| WO | WO 2020/195997 A1 | 10/2020 |

\* cited by examiner

FLUORESCENT NANODIAMOND AND METHOD FOR PRODUCING SAME

TECHNICAL FIELD

The present invention relates to a method of producing a fluorescent nanodiamond.

BACKGROUND ART

A luminescent center in diamond is a nanosized chemically stable fluorescent chromophore and does not exhibit degradation, fading, or flickering in vivo, which often occur in organic fluorescent, and thus is expected as probes for fluorescence imaging. In addition, information on spins of electrons excited in the luminescent center can sometimes be measurable externally, and thus the luminescent center is also expected to be utilized in optically detected magnetic resonance (ODMR) or as a quantum bit.

The currently available luminescent center is a nitrogen-vacancy (NV) center, and the NV center is composed of a N atom as an impurity present in a lattice site in diamond and a vacancy (V) occupying the lattice site adjacent to the N atom. There are two types of NV centers, $NV^0$, which is electrically neutral, and $NV^-$, in which one electron is captured in the vacancy site, and both can be utilized as probes for fluorescence imaging.

Although a method of producing a nanodiamond by a detonation method is known (Patent Document 1), no NV center fluorescence can be detected from the nanodiamond produced by the detonation method.

CITATION LIST

Patent Document

Patent Document 1: JP 2005-289677 A

SUMMARY OF INVENTION

Technical Problem

An object of the present invention is to provide a fluorescent nanodiamond that is obtained by a detonation method and has a ZPL (Zero Phonon Line) derived from an NV center with sharp peaks corresponding to $NV^0$ and/or $NV^-$ on its fluorescence emission wavelength spectrum.

Solution to Problem

The present invention provides the following method for producing a fluorescent nanodiamond.

[1] A method of producing a fluorescent nanodiamond exhibiting a zero phonon line (ZPL) for $NV^0$ and/or $NV^-$ on its fluorescence emission wavelength spectrum, the method including:

(Step 1) a detonation step of exploding at least one type of explosive in an airtight container to obtain a nanodiamond raw material;

(Step 2) a first annealing step of annealing, at a temperature from 1000° C. to 1600° C., the nanodiamond raw material or a nanodiamond which is obtained by removing sp2 carbon through strong acid treatment, ozone treatment, or gas-phase oxidation from the nanodiamond raw material;

(Step 3) a vacancy forming step of creating vacancies on the nanodiamond by irradiating the nanodiamond with an ion beam or an electron beam after the first annealing step; and (Step 4) a second annealing step of annealing, at a temperature from 600° C. to 900° C., the nanodiamond containing vacancies to form Nitrogen-Vacancy (NV) centers.

[2] The method of producing a fluorescent nanodiamond according to [1], where the nanodiamond raw material obtained in the detonation step is subjected to the first annealing step after sp2 carbon is removed through strong acid treatment, ozone treatment, or gas-phase oxidation.

[3] The method of producing a fluorescent nanodiamond according to [1] or [2], further including:

(Step 5) an sp2 carbon removal step of performing gas-phase oxidation, ozone oxidation, or strong acid treatment on the nanodiamond obtained in the second annealing step.

Advantageous Effects of Invention

Although little or no fluorescence due to NV centers can be detected for the nanodiamond produced by the detonation method, the production method according to the present invention makes it possible to obtain a nanodiamond that exhibits fluorescence due to NV centers.

The fluorescent nanodiamond obtained by the production method according to the present invention is useful as a probe for fluorescence imaging of samples derived from living organisms, because the fluorescent nanodiamond is nanosized, chemically stable, and causes no in vivo degradation, fading, or flickering, and produces long wavelength fluorescence. Information on spins of electrons excited in the NV luminescent center can sometimes be measurable externally, and thus, the fluorescent nanodiamond is also expected to be utilized in optically detected magnetic resonance (ODMR) or as a quantum bit or a quantum sensor.

DETAILED DESCRIPTION OF THE PREFERRED EMBODIMENT

Figure 1:
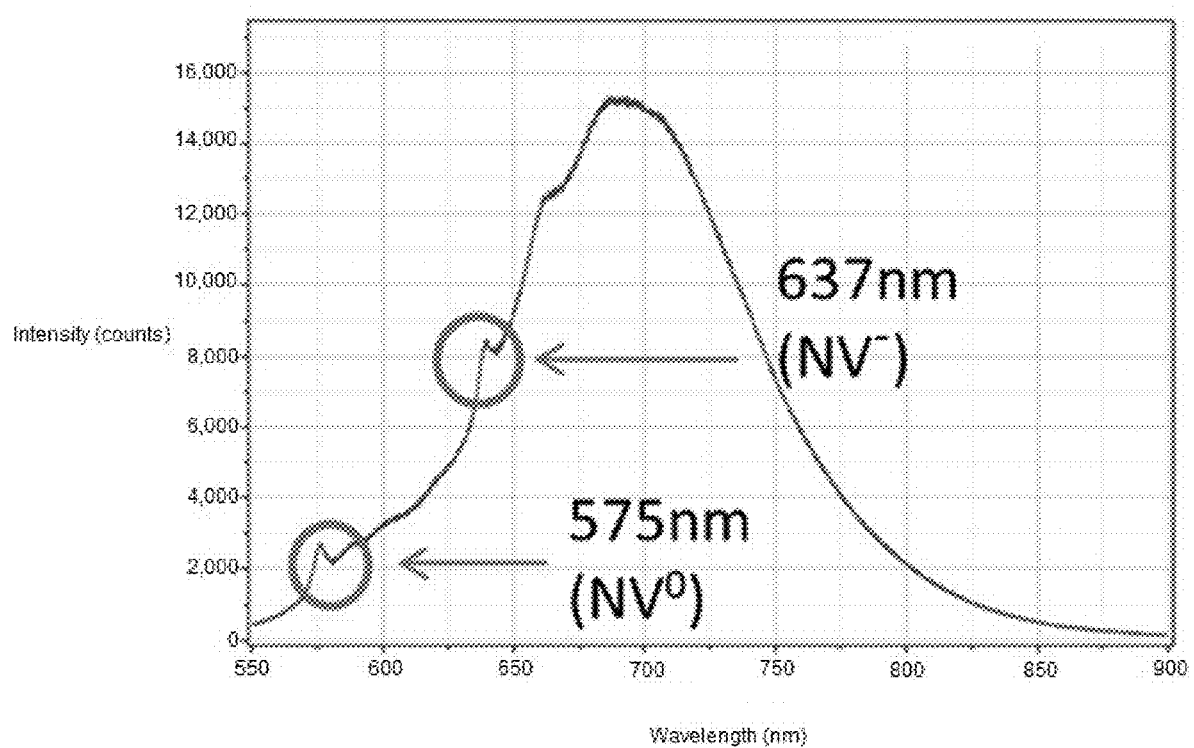
FIG. 1 is a fluorescence emission wavelength spectrum of a fluorescent nanodiamond obtained by a production method according to the present invention.

The nanodiamond obtained by the production method according to the present invention exhibits fluorescence due to NV centers. The fluorescence emission wavelength spectrum of the NV center has a sharp peak referred to as a zero phonon line (ZPL) and a broad peak referred to as a sub-band. There are two types of NV centers: $NV^0$, which is electrically neutral; and $NV^-$, in which one electron is captured in the vacancy site, and the ZPL includes two peaks: 575 nm ($NV^0$) and 637 nm ($NV^-$). The fluorescent nanodiamond obtained by the production method according to the present invention may utilize the ZPL at either 575 nm ($NV^0$) or 637 nm ($NV^-$ nm), or at both. The peak at 637 nm ($NV^-$), which is longer than 575 nm, is desired because of the excellent transmission through biological samples, and a preferred fluorescent nanodiamond includes, on its fluorescence emission wavelength spectrum, one peak at 637 nm ($NV^-$ nm), or two peaks at 575 nm ($NV^0$) and 637 nm ($NV^-$ nm). The NV center has a structure in which two adjacent carbon atoms are replaced by a pair of a nitrogen atom and an atomic vacancy, and one N and one V are present adjacent to each other.

The average size of the primary particles of the fluorescent nanodiamond is preferably 10 nm or less. If the average size of the primary particles is 10 nm or less, the diamond is particularly useful as a probe for fluorescence imaging of samples derived from living organisms. The nanodiamond with primary particles of 10 nm or less in average size can be obtained by a detonation step. The average size of the primary particles can be determined by the Scherrer equation from the analysis result of powder X-ray diffractometry (XRD). Examples of the measuring apparatus for XRD may include a fully automatic multi-purpose X-ray diffractometer (available from Rigaku Corporation).

In one preferred embodiment of the present invention, the surface of the fluorescent nanodiamond may have at least one oxygen-containing functional group terminal and/or at least one hydrogen-containing terminal. Examples of the oxygen-containing functional group terminal include OH, COOH, CONH$_2$, C=O, and CHO, and OH, C=O, and COOH are preferred. Examples of hydrogen-containing terminal include an alkyl group having from 1 to 20 carbon atoms. The oxygen-containing functional group terminal can be introduced at the sp2 carbon removal step in Step 5.

The presence of at least one oxygen-containing functional group terminal on the surface of the fluorescent nanodiamond is preferred because aggregation of the nanodiamond particles can be suppressed. The presence of at least one hydrogen-containing terminal on the surface of the fluorescent nanodiamond is preferred because the zeta potential becomes positive, thereby leading to stable and high dispersion in an acidic aqueous solution.

In another preferred embodiment of the present invention, the fluorescent nanodiamond according to the present invention may have a core-shell structure. The core of the fluorescent nanodiamond that has the core-shell structure is nanodiamond particles. This core has an NV center and exhibits fluorescence. The shell is a non-diamond coating layer, which may include sp2 carbon, and preferably further contains oxygen atoms. The shell may be a graphite layer. The thickness of the shell is preferably 5 nm or less, more preferably 3 nm or less, even more preferably 1 nm or less. The shell may have hydrophilic functional groups at the surface.

The sp2 carbon can be partially or completely removed by strong acid treatment, gas-phase oxidation treatment, ozone oxidation treatment, or the like.

While the nanodiamond raw material obtained in the detonation step is subjected to a first annealing step, the nanodiamond raw material obtained in the detonation step includes a substantial amount of sp2 carbon in addition to the nanodiamond, and the nanodiamond raw material is thus preferably subjected to the first annealing step after the sp2 carbon is removed by treatment of removing sp2 carbon, such as strong acid treatment, ozone treatment, or gas-phase oxidation, to increase the ratio of the nanodiamond. The nanodiamond obtained in the detonation step has soot, and thick sp2 carbon (shell) at the nanodiamond particle surfaces, which can be mostly removed by treatment of removing sp2 carbon, such as strong acid treatment, ozone treatment, or gas-phase oxidation.

The first annealing step has a high treatment temperature, and fine nanodiamond particles (for example, of 1 nm or less in particle size) are thus mostly converted to sp2 carbon. In contrast, larger particles (for example, of 5 nm or more in particle size) have surfaces partially turned to sp2 carbon by the first annealing step, but the core of sp3 carbon will be mostly left. As a result, the removal of the fine particles increases the average particle size of the nanodiamond particles, and reduces the width of the particle size distribution, thereby resulting in fluorescent nanodiamonds with aligned particle sizes. The removal of fine nanodiamond particles by the first annealing step can be confirmed by small-angle X-ray scattering method (SAXS).

In one preferred embodiment of the present invention, after performing the first annealing step, the sp2 carbon can be removed by treatment of removing sp2 carbon, such as strong acid treatment, ozone treatment, or gas-phase oxidation, and thereafter, a vacancy forming step and a second annealing step can be performed.

In another preferred embodiment of the present invention, after performing the first annealing step, a vacancy forming step may be performed, thereafter, the sp2 carbon may be removed by treatment of removing sp2 carbon, such as strong acid treatment, ozone treatment, or gas-phase oxidation, and a second annealing step may be then performed.

In Step 3, the description of "a vacancy forming step of irradiating the nanodiamond with an ion beam or an electron beam after the first annealing step" is intended to describe the order of the first annealing step and the vacancy forming step, and Step 3 includes a case of (first annealing step), then (optional step of sp2 carbon removal step), and then (vacancy forming step).

In Step 4, the description of "a second annealing step of annealing the nanodiamond with a vacancy formed at a temperature from 600° C. to 900° C. to form an NV (Nitrogen-Vacancy) center" is intended to describe the order of the vacancy forming step and the second annealing step, and Step 4 includes a case of (vacancy forming step), then (optional step of sp2 carbon removal step), and then (second annealing step).

In addition, after Step 4, the sp2 carbon removal step may be further performed.

The vacancy forming treatment is performed by irradiation with an ion beam or an electron beam to introduce vacancies into the nanodiamond particles. No NV center is formed at that point, but the subsequent second annealing process moves the vacancies in the nanodiamond particles to form the NV center.

After the second annealing step, sp2 carbon can be removed by gas-phase oxidation, ozone oxidation, strong acid treatment, or the like to obtain fluorescent nanodiamonds with an NV center.

In one embodiment of the present invention, the center of the nanodiamond particle obtained in the detonation step has a diamond structure of sp3 carbon, the surface of which is covered with an amorphous layer composed of sp2 carbon. In a further preferred embodiment, the outside of the amorphous layer may be covered with a graphite oxide layer. In addition, a hydration layer may be formed between the amorphous layer and the graphite oxide layer.

In one preferred embodiment of the present invention, the fluorescent nanodiamond has a plus or minus zeta potential. The zeta potential of fluorescent nanodiamond is preferably −70 to 70 mV, more preferably −60 to 30 mV.

In the production method according to the present invention, the detonation step (Step 1) can be performed by exploding at least one type of explosive in an airtight container. Examples of the container include a metallic container and a synthetic resin container.

The explosive is not particularly limited, and known explosives containing nitrogen atoms can be widely used.

Specific examples include trinitrotoluene (TNT), cyclotrimethylenetrinitramine (hexogen, RDX), cyclotetramethylenetetranitramine (octogen), trinitrophenylmethylnitramine (tetryl), pentaerythritol tetranitrate (PETN), tetranitromethane (TNM), triamino-trinitrobenzene, hexanitrostilbene, and diaminodinitrobenzofuroxan, and one of these examples can be used alone, or two or more thereof can be used in combination. The nitrogen atoms contained in the explosive are incorporated into the nanodiamond. In one preferred embodiment, the explosive further includes a cooling medium. The cooling medium may be solid, liquid, or gas. Examples of the method of using the cooling medium include a method of detonating the explosive in the cooling medium. Examples of the cooling medium include inert gas (nitrogen, argon, CO), water, ice, and liquid nitrogen. In the case of water or ice, for example, the cooling medium is preferably used at a level of approximately 5 times the weight of the explosive.

The nanodiamond obtained in the detonation step has a certain amount of nitrogen atoms (for example, 1.0 to 5.0% by mass), and the nitrogen atoms bind to the vacancies to form the NV center.

The nanodiamond obtained by the detonation step is, if necessary, subjected to treatment removing sp2 carbon, such as strong acid treatment, ozone treatment, and gas-phase oxidation, and further subjected to the first annealing treatment.

In this specification, examples of the strong acid for use in the strong acid treatment for removing sp2 carbon include strong acids capable of removing sp2 carbon, preferably strong acids capable of oxidatively removing sp2 carbon, such as concentrated nitric acid, fuming nitric acid, mixed acids of concentrated sulfuric acid and concentrated nitric acid, and aqua regia. An example of a preferred strong acid may be a mixed acid of concentrated sulfuric acid:concentrated nitric acid=100:1 to 1:10 (ratio by mass). The temperature of the strong acid treatment is not particularly limited, but is, for example, from 50 to 250° C., and the time of the strong acid treatment is not particularly limited, but is, for example, 0.5 to 24 hours. The strong acid is used in an amount of preferably 5 times to 2000 times, more preferably 10 times to 1000 times, even more preferably 20 times to 500 times the mass of the nanodiamond raw material or nanodiamond.

In this specification, the ozone oxidation for removing sp2 carbon can be performed at an ozone concentration from 100 to 20000 ppm and a reaction temperature preferably from 150 to 500° C. for a reaction time from 0.5 to 10 hours.

In this specification, the gas-phase oxidation for removing sp2 carbon can be performed in the atmosphere, and the gas-phase oxidation temperature is preferably 300° C. or higher, and the gas-phase oxidation time is 2 hours or longer.

The temperature of the first annealing step (Step 2) is preferably 1000 to 1600° C., more preferably 1200 to 1500° C., and the time of the first annealing step is not particularly limited, but is 1 to 10 hours, for example.

The vacancy forming step (Step 3) is performed by ion beam irradiation or electron beam irradiation. For the density of vacancies to be introduced by ion beam irradiation or electron beam irradiation, the upper limit is limited by a concentration at which the diamond is broken (a vacancy concentration of $>1\times10^{21}/cm^3$), but the lower limit is, for example, $1\times10^{16}/cm^3$ or higher, or even $1\times10^{18}/cm^3$ or higher. The high-energy beam for irradiating this diamond raw material with a high-energy beam is preferably an ion beam. The ion beam is preferably an ion beam of hydrogen (H) or helium (He). For example, the energy of the ion beam of hydrogen is preferably from 10 to 1500 keV, and the energy of the ion beam of helium is preferably from 20 to 2000 keV. The energy of the electron beam is preferably from 500 to 5000 keV.

No NV center is formed at the point of forming the vacancies, and the second annealing step moves the vacancies in the nanodiamond particles, thereby causing the vacancies to bind to the nitrogen atoms inside to form the NV center, and then allowing for the fluorescent nanodiamond according to the present invention.

The temperature of the second annealing step (Step 4) is not particularly limited as long as the vacancies (V) move to form the NV center, but is preferably 600 to 900° C., more preferably 750 to 850° C., and the time of the second annealing step is not particularly limited, but is 0.5 to 10 hours, for example.

The second annealing step forms sp2 carbon at the nanodiamond surface, and thus, in one preferred embodiment of the present invention, at least one type of treatment selected from the group consisting of gas-phase oxidation, ozone oxidation, and strong acid treatment is performed for removing the sp2 carbon, thereby allowing for more preferred fluorescent nanodiamond particles.

The treatment of removing sp2 carbon, such as strong acid treatment, ozone treatment, or gas-phase oxidation, in Step 5 can be performed under the same conditions as mentioned above.

The gas-phase oxidation conditions in Step 5 can be performed in the atmosphere, and the gas-phase oxidation temperature is preferably 300° C. or higher, and the gas-phase oxidation time is 2 hours or longer.

For the ozone oxidation conditions, the ozone concentration is 100 to 20000 ppm, the reaction temperature is preferably 150 to 500° C., and the reaction time is 0.5 to 10 hours.

EXAMPLES

Hereinafter, the present invention will be described more specifically with reference to examples, but the present invention is not limited by these examples.

Example 1

A fluorescent diamond was produced by the following Steps (I) to (VII).
(I) Detonation Step
Nanodiamond was produced in accordance with a normal method of nanodiamond production with the use of about 1000 g of an explosive composition containing trinitrotoluene (TNT) and cyclotrimethylenetrinitramine (RDX).
(II) Mixed Acid Treatment Step (Sp2 Carbon Removal Step)
To 500 g of a mixed acid having a ratio of concentrated sulfuric acid:concentrated nitric acid=12:1 (ratio by mass), 5 g of the nanodiamond raw material obtained in the detonation step was added, and the mixture was treated at 150° C. for 5 hours while stirring.
(III) First Annealing Step
The nanodiamond subjected to the mixed acid treatment was subjected to annealing at 1400° C. for 3 hours under a vacuum atmosphere to sort out large nanodiamond particles and convert small nanodiamond particles to sp2 carbon.
(IV) Mixed Acid Treatment Step (Sp2 Carbon Removal Step)
To 820 g of a mixed acid having a ratio of concentrated sulfuric acid:concentrated nitric acid=8:1 (ratio by mass), 8 g of the nanodiamond obtained in the detonation step was added, and the mixture was treated at 200° C. for 10 hours while stirring to remove sp2 carbon at the surfaces of the large nanodiamond particles and remove the particles entirely converted to sp2 carbon. The first annealing step and the mixed acid treatment step can remove the small nanodiamond particles. The particle sizes of the large nanodiamond particles are somewhat reduced by the conversion of sp3 carbon at the surfaces to sp2 carbon and the removal of the sp2 carbon with the mixed acid, but the average particle size is larger than that of the nanodiamond after the detonation step.

(V) Vacancy Forming Step

The nanodiamond subjected to the mixed acid treatment was irradiated with an ion beam of helium at 180 keV to form vacancies in the nanodiamond.

(VI) Second Annealing Step

The nanodiamond with the vacancies formed therein was subjected to annealing at 800° C. for 30 minutes under a vacuum atmosphere to move the vacancies and form an NV center.

(VII) Gas-Phase Oxidation Step (Sp2 Carbon Removal Step)

The annealed nanodiamond was subjected to gas-phase oxidation treatment at 300° C. for 2 hours under the atmosphere to remove sp2 carbon at the nanodiamond surface and obtain a fluorescent nanodiamond according to the present invention.

The obtained fluorescent nanodiamond was subjected to XRD analysis, fluorescence analysis, and elemental analysis. The results are shown in Table 1 and illustrated in FIG. 1.

<XRD Analysis>

The change in crystallite size was measured.

Figure 2:
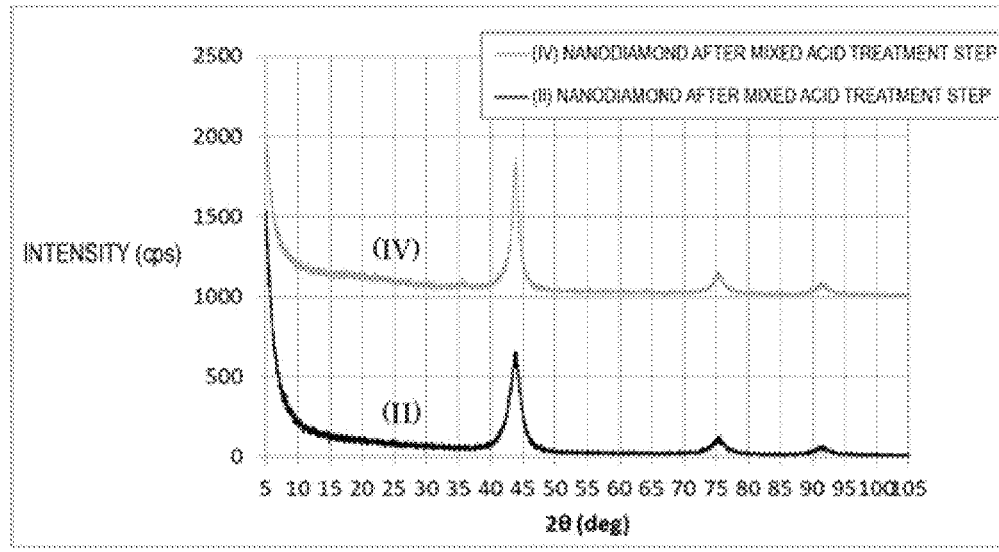
FIG. 2 shows XRD measurement results.

The nanodiamond powder obtained above after the "(IV) Mixed Acid Treatment Step" or the nanodiamond powder obtained in the "(II) Mixed Acid Treatment Step" was loaded directly into a non-reflective Si plate sample holder, and subjected to measurement with the use of an X-ray diffractometer (trade name "Smart Lab", available from Rigaku Corporation). The measurement results are illustrated in FIG. 2. The crystallite size of nanodiamond was estimated by the Scherrer method.

The crystallite size in accordance with the Scherrer method was increased to 6.2 nm of the nanodiamond after the "(IV) Mixed Acid Treatment Step" (ND after 200° C. mixed acid treatment) from 4.2 nm of the nanodiamond obtained in the "(H) Mixed Acid Treatment Step" (ND before treatment).

<Small-Angle X-Ray Scattering Measurement (SAXS Method)>

Figure 3:
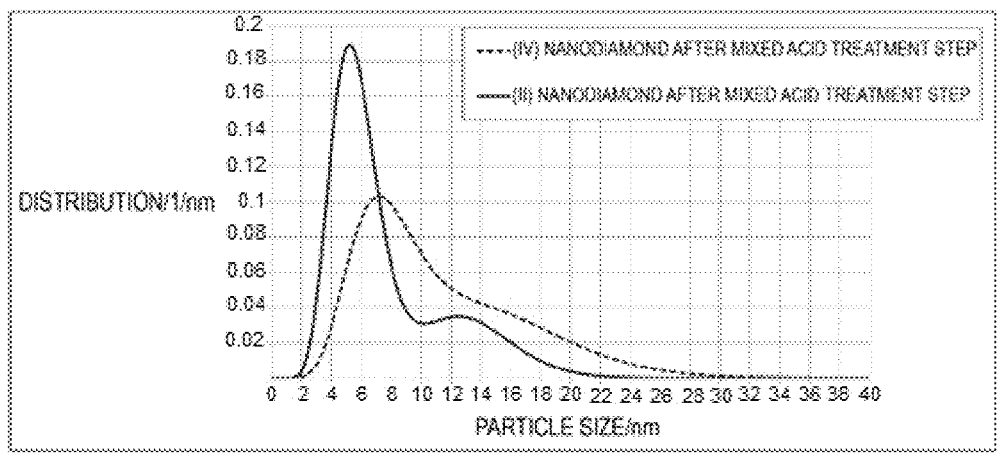
FIG. 3 shows SAXS measurement results.

The nanodiamond particles were subjected to measurement by small-angle X-ray scattering method (SAXS). The measurement was performed under the following measurement conditions with the use of a fully automatic horizontal multi-purpose X-ray diffractometer (available from Rigaku Corporation, trade name "SmartLab"). The obtained measurement data was then analyzed to obtain a particle size distribution curve. Software "NANO-Solver" from Rigaku Corporation was used for the analysis of curve fitting. The volume-based particle size distribution curves obtained from the analysis (synthesized distribution) are illustrated in FIG. 3.

(Measurement Conditions)

Scatterer model: sphere
Measurement method: Transmission method
Particle/vacancy: C
Matrix: Air (AIR)
Slit correction: High
Analyzer crystal: No
Analysis range: from 0.2000° to 3.0000°
Step: 0.0040°
Wavelength: CuKα characteristic x-ray (wavelength: 0.1541867 nm)
Tube voltage: 50 kV
Tube current: 300 mA
Distribution function: F distribution
Height (mm):
Filament: 8.00
CBO Selection Slit: 15.00
Incident slit: 10.00
Sample: 20.00
Receiving slit (RS) 1: 20.00
Receiving slit (RS) 2: 20.00
Distance (mm):
Focus-CBO: 115.8
CBO-incident slit: 74.2
Incident Slit-sample: 110.0
Sample-RS1: 185.5
RS1-RS2: 114.5
RS2-detector window: 33.0

<Elemental Analysis>

For the analyzer, a micro coder JM 10 available from J-Science Lab Co., Ltd. was used. A calibration curve was created with the use of antipyrine as a standard sample. In addition, acetoanilide was analyzed as calibration.

The nanodiamond powder obtained above after the "(IV) Mixed Acid Treatment Step" or the nanodiamond powder obtained in the "(II) Mixed Acid Treatment Step" was weighed for about 1.3 mg, and then analyzed. Three measurements were made and averaged. The results are shown in Table 1.

TABLE 1

| Sample Name | <H %> Average | <C %> Average | <N %> Average |
|---|---|---|---|
| (II) Nanodiamond after Mixed Acid Treatment Step | 0.80 | 87.13 | 2.23 |
| (IV) Nanodiamond after Mixed Acid Treatment Step | 0.54 | 86.67 | 1.69 |

The amount of nitrogen has been found to decrease by 24% through the first annealing step and the subsequent mixed acid treatment step.

<Fluorescence Analysis>

A 10 w/v % water suspension of the fluorescent nanodiamond according to the present invention, obtained by the gas-phase oxidation, was added dropwise onto a glass substrate and dried to produce an evaluation sample. The obtained evaluation sample was subjected to high-speed mapping with the use of a micro-Raman spectrophotometer (trade name: micro-laser Raman spectrophotometer LabRAM HR Evolution, available from Horiba, Ltd.) to find NV brightness, and details were analyzed by individual brightness measurements.

The conditions for the high-speed mapping and individual brightness measurements are shown in Tables 2 and 3 below, and the fluorescence emission wavelength spectrum of the fluorescent nanodiamond obtained by the individual brightness measurements is illustrated in FIG. 1.

TABLE 2

| High-speed Mapping Measurement Conditions | |
|---|---|
| Laser Wavelength | 532 nm |
| Measurement Range | 550 to 650 nm |
| Laser Power | 150 µW |
| SWIFT Exposure Time | 0.2 s |
| Cumulative Number of Scans | 1 |
| Mapping Measurement Range | 100 × 100 µm |
| Mapping Measurement Interval | 1 µm |
| Number of Mapping Measurement Points | 10201 Points |

TABLE 3

| Individual Brightness Measurement Conditions | |
|---|---|
| Laser Wavelength | 532 nm |
| Measurement Range | 550-900 nm |
| Laser Power | 150 µW |
| Exposure Time | 1 s |
| Cumulative Number of Scans | 2 |

The results of the micro-Raman analysis has successfully confirmed ZPL derived from the NV center for the fluorescent nanodiamond produced according to the present invention.

What is claimed is:

1. A method of producing a fluorescent nanodiamond exhibiting a zero phonon line (ZPL) for Nitrogen-Vacancy (NV) centers, which are $NV^0$ or $NV^-$, on its fluorescence emission wavelength spectrum, the method comprising:
   (i) a detonation of exploding at least one explosive in an airtight container to obtain a nanodiamond raw material;
   (ii) a first annealing at a temperature from 1200° C. to 1500° C., of (a) the nanodiamond raw material or (b) a nanodiamond which is obtained by removing sp2 carbon through strong acid treatment, ozone treatment, or gas-phase oxidation from the nanodiamond raw material;
   (iii) a vacancy formation of creating vacancies on the nanodiamond by irradiating the nanodiamond with an ion beam or an electron beam after the first annealing; and
   (iv) a second annealing at a temperature from 600° C. to 900° C., which is different from the temperature range of the first annealing, of the nanodiamond containing vacancies to move the vacancies and form NV centers.

2. The method of producing a fluorescent nanodiamond according to claim 1, wherein the nanodiamond raw material obtained in the detonation is subjected to the first annealing after sp2 carbon is removed through strong acid treatment, ozone treatment, or gas-phase oxidation.

3. The method of producing a fluorescent nanodiamond according to claim 1, further comprising:
   (v) an sp2 carbon removal of performing gas-phase oxidation, ozone oxidation, or strong acid treatment on the nanodiamond obtained in the second annealing.

4. The method of producing the fluorescent nanodiamond according to claim 3, wherein the gas-phase oxidation in said (v) is conducted at a temperature of 300° C. or higher.

5. The method of producing the fluorescent nanodiamond according to claim 3, wherein the gas-phase oxidation in said (v) is conducted 2 hours or longer.

6. The method of producing the fluorescent nanodiamond according to claim 3, further comprising:
   (v) an sp2 carbon removal treatment selected from the group consisting of an acid treatment, an ozone treatment, and a gas-phase oxidation to the nanodiamond in which the vacancies are moved and the NV centers are formed.

7. The method of producing the fluorescent nanodiamond according to claim 6, wherein said sp2 carbon removal treatment is the acid treatment conducted by a mixture of sulfuric acid and nitric acid, and wherein an amount of the mixture is from 20 times to 500 times compared to an amount of the nanodiamond by mass.

8. The method of producing the fluorescent nanodiamond according to claim 6, wherein said sp2 carbon removal treatment is the ozone treatment conducted at a temperature being from 150° C. to 500° C.

9. The method of producing the fluorescent nanodiamond according to claim 1, wherein the fluorescent nanodiamond comprises an oxygen-containing functional group terminal on the surface thereof.

10. The method of producing the fluorescent nanodiamond according to claim 1, wherein the first annealing is conducted at a temperature from 1400° C. to 1500° C.

* * * * *

UNITED STATES PATENT AND TRADEMARK OFFICE
CERTIFICATE OF CORRECTION

| | | |
|---|---|---|
| PATENT NO. | : 12,018,196 B2 | Page 1 of 1 |
| APPLICATION NO. | : 17/220844 | |
| DATED | : June 25, 2024 | |
| INVENTOR(S) | : Ming Liu et al. | |

It is certified that error appears in the above-identified patent and that said Letters Patent is hereby corrected as shown below:

In the Specification

Column 8, Line 31, delete "acetoanilide" and insert -- acetanilide --.

In the Claims

Column 9, Line 29, Claim 1, delete "or" and insert -- and/or --.

Signed and Sealed this
Seventeenth Day of December, 2024

Derrick Brent
*Acting Director of the United States Patent and Trademark Office*